INVENTORS:
RONALD FREDERICK BOURNE
AND DONALD GORDON CHEYNE
BY Robert H. Jacob
AGT.

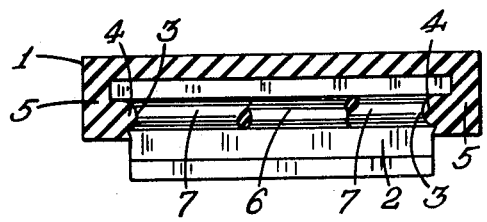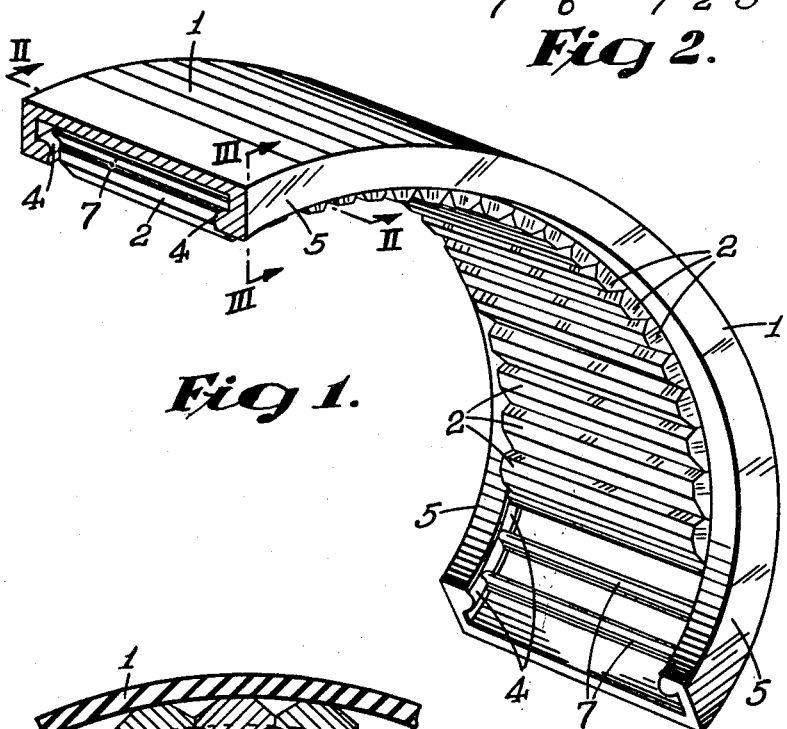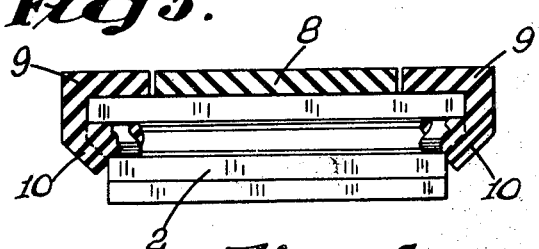

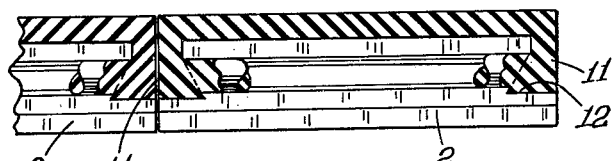
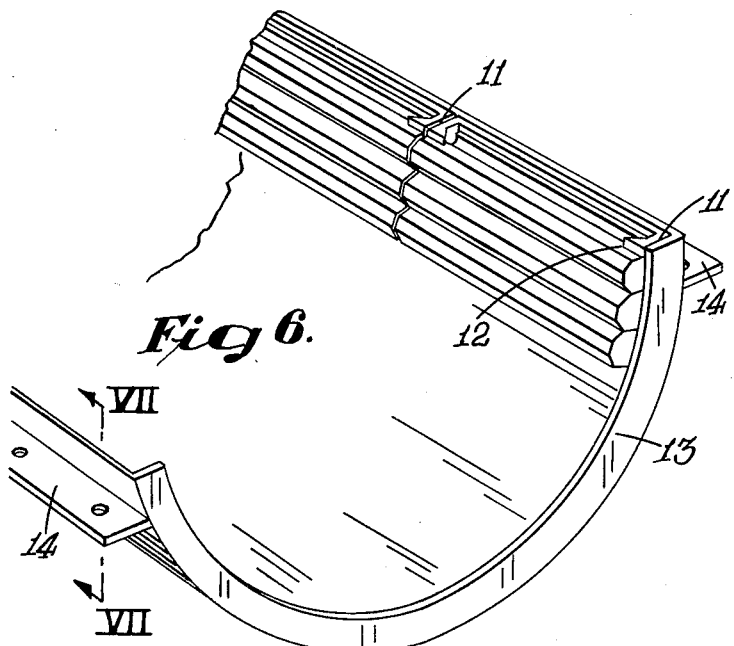
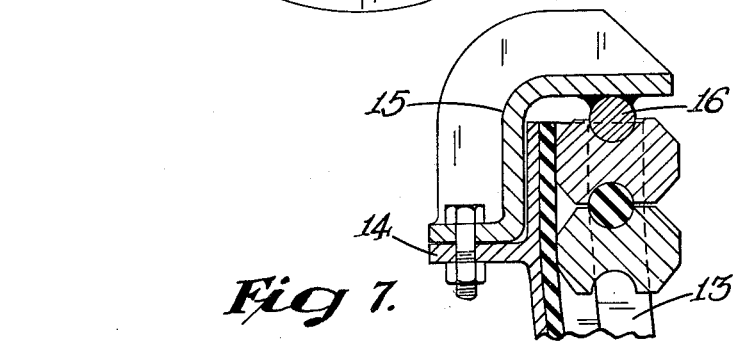

United States Patent Office 3,194,506
Patented July 13, 1965

3,194,506
RENEWABLE ELEMENTS WHICH ARE SUBJECT TO WEAR BY ABRASION
Ronald F. Bourne, "Wyness" Oak Road Atholl, and Donald G. Cheyne, 47A 12th Ave., Parktown N., both of Johannesburg, Transvaal, Republic of South Africa
Filed Jan. 22, 1963, Ser. No. 253,166
Claims priority, application Republic of South Africa, Mar. 8, 1962, 62/961; Sept. 24, 1962, 62/4,038; Sept. 24, 1962, 62/4,039
11 Claims. (Cl. 241—300)

This invention relates to renewable elements which are subject to wear by abrasion. In this specification, the term "liner" will be used to denote all such elements.

While the liners of the invention are particularly suitable for lining grinding mills, they can also be applied to virtually any surface, curved or flat, which it is desired to protect. For example, they can be applied to chutes or tanks and they can be used as mats or tracks to take heavy localised wear such as that imposed by vehicles.

According to the invention, a liner comprises a plurality of rod-like members of rigid abrasion resisting material disposed in parallel relationship, and key elements interposed betwen adjacent members to lock them together.

The members may be provided on opposite sides with grooves of semi-circular or other section, the arrangement being such that a key element can be inserted into the abutting grooves of adjacent members to lock them together.

The members may be symmetrical so that they may be reversed as required. A suitable cross-section is that which in general terms may be described as approximating to an hour glass or figure eight.

The key elements may be in the form of rods of rubber or any other suitable resilient material.

Also, in accordance with the invention, retaining means may be provided to hold the liner in position in a direction transverse to the rod-like members. The retaining means may permit removal of the members.

The said retaining means may be in the nature of abutments located at opposite ends of the liner and arranged to prevent movement of the liner or any of its elements in a direction transverse to the rod-like members. The abutments may be detachably secured to the surface to be protected or to a part associated therewith.

By applying a suitable compressive force to the liner in a direction transverse to the rod-like members, a self-supporting structure can be obtained.

The liners of the invention may be applied to the inner periphery of a circular duct or casing, such as that of a tube, ball or rod mill. With its members disposed axially along the casing, the liner is formed into a closed loop when viewed in an axial direction. A suitable retaining member is located between the ends of the loop and is detachably secured to the duct or casing. By arranging the retaining member to exert a compressive force on the liner in a circumferential direction transverse the rod-like members, the liner will be self-supporting and no further attachment to the duct or casing is required. Retaining means including a wedge formation may conveniently be used.

A pad of rubber or other flexible material may be interposed between the liner and the wall of the duct or casing.

Further according to the invention, retaining means may be provided to hold the rod-like members in position in a longitudinal direction relative to the members and it may permit removal of the rod-like members.

Thus, a liner according to the invention may include a base strip of flexible material of substantially channel section, the rod-like members being located transversely to the base strip between the sides of the channel by which they are gripped.

The base strip may be made of rubber or other suitable material.

The inner faces of the channel sides may be formed with ribs which are engageable with corresponding flutes in the end faces of the rod-like members to hold the latter in place. This arrangement provides not only longitudinal but also transverse retention of the rod-like members.

Alternatively, the sides of the channel may include towards their outer ends, retaining formations extending inwards towards one another. Thus, continuous recesses extending transversely to the rod-like members and adapted to receive the ends of the rod-like members or projections thereon may be defined between the retaining formations, the sides proper of the base strip and the bottom of the base strip. The base strip may also include end walls to provide transverse retention of the rod-like members in a direction along the wear resisting surface.

Where a base strip of rubber or the like and key members in the form of rubber or like rods are used, the key members may be bonded to the base strip.

The linear members may abut against the inner face of the bottom of the flexible channel base strip.

Where the ends of the linear members or projections thereon are engageable with recesses in the inner faces of the sides of the channel section base strip, the working faces of the rod-like members may be shorter than the overall length of the members to permit location of the working faces between the inner surfaces or edges of the surrounds of the recesses. Such linear members will not be reversible. Where two or more liners each including a channel section base strip are located side by side with adjacent sides of the base strips abutting and the rod-like members of different sets disposed in end to end relationship, adjacent ends of different sets of rod-like members will be spaced apart.

In certain applications this may be a disadvantage. The working faces of the members of a liner may accordingly be substantially equal in length to the overall width of the base strip in which the members are mounted, the ends of the rod-like members being notched to receive the surrounds of the recesses in the sides of the base strip. With this arrangement, the adjacent ends of the rod-like members of juxtaposed liners can abut. Such rod-like members are also not reversible.

One or more juxtaposed liners may, for example, be applied to the inner periphery of a semi-circular trough, the rod-like members being disposed axially along the trough with the liners in arcuate formation in a direction transverse to the members. The juxtaposed liners may be located between retaining flanges on the trough, extending transverse to the members. Abutments may be detachably secured to the trough along the axial edges thereof and arranged to hold the liners in position in a circumferential direction transverse to the members.

In another embodiment, a liner according to the invention includes at least one flanking member adapted to grip the rod-like members at one end thereof. Preferably, a pair of flanking retaining members are arranged to grip the rod-like members at opposite ends.

A central base element may be provided between a pair of separate flanking retaining members of flexible material adapted to grip the ends of the rod-like members.

The base element and the flanking retaining members may be made of rubber or any other suitable material.

The flanking retaining members may be mounted or held in position in any suitable manner. For example, they may be secured to or held in position by the surface to be protected or a part associated therewith. The base element may also be secured to the said surface but this is not essential.

The central base element is preferably substantially flat in cross-section and is in the nature of a pad located between the rod-like members and the surface to be protected. The flanking retaining members are of substantially channel section with one arm or side of each retaining member lying in the same plane as the base element and in abutting relationship thereto.

It is possible to provide a central base element and flanking retaining members which, in assembled condition, present a composite structure which is similar in appearance and function to a substantially channel section base strip as disclosed above, with the only exception that it is not of integral construction.

Two or more liners each consisting of rod-like members locked together by keys interposed between adjacent members, may simply be located side by side with the members of adjacent liners in end to end abutting relationship, without a base strip having retaining and gripping formations being provided. A pad of rubber or any other suitable material may, however, be located between each liner and the surface to be protected. Retaining means is positioned against the outer ends of the outer liners. When applied to the inner periphery of a casing, the juxtaposed liners may conveniently be positioned between retaining flanges on the casing extending transverse to the linear members to provide longitudinal retention of the rod-like members.

Additionally, retaining means may be located against each end member in each set of rod-like members for transverse retention.

The invention includes within its scope rod-like members as described above for use in the liners of the invention.

When applied to the inner peripheral wall of a grinding mill, the ends of the rod-like members may be chamfered or tapered in an outward direction to co-operate with complementarily tapered faces on an annular or other locking member.

The invention and the manner in which it is to be performed will be further described, purely by way of example, with reference to the accompanying drawings, in which:

FIGURE 1 is an oblique view showing one form of liner according to the invention.

FIGURE 2 is a cross-section on the line II—II of FIGURE 1.

FIGURE 3 is a cross-section on the line III—III of FIGURE 1.

FIGURE 4 is a cross-section similar to FIGURE 2 but showing an alternative form of liner.

FIGURE 5 is a cross-section similar to FIGURE 2 but showing another form of liner.

FIGURE 6 is an oblique view showing the manner in which the type of liner shown in FIGURE 5 may be used to line a semi-circular trough.

FIGURE 7 is a cross-section on the line VII—VII of FIGURE 6.

Figure 8:
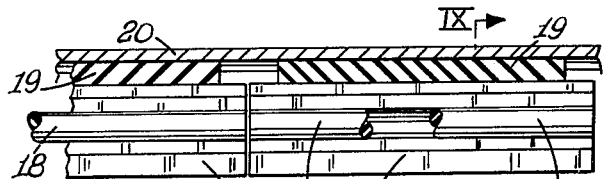
FIGURE 8 is a cross-section showing still another form of liner.

Referring to FIGURES 1 to 3, the liner comprises a rubber base strip 1 of channel section. A plurality of parallel steel rods 2 are mounted in spaced relationship between the sides of the channel and the ends of such rods are fluted at 3 to co-operate with inwardly extending ribs 4 formed on the inner faces of the channel sides 5. Opposite sides of the rods 2 are grooved at 6 to accommodate rubber key rods 7 disposed between adjacent rods 2 to lock them together. The keys 7 may be bonded to the channel sides 5.

The arrangement of FIGURE 4 is generally similar but instead of the base strip being of integral construction, it comprises a base element 8 and separate side strips 9. Where a liner of this type is used to line a circular casing such as that of a grinding mill, the arch formed by the liner can be self-supporting and the side strips 9 which may be attached to the mill doors will act primarily as seals. The side strips in this case are not formed with ribs nor are the ends of the rods fluted to receive ribs. Instead, the side strips are formed with inwardly extending flanges 10.

The liner of FIGURE 4 has steel rods which present a working face which is materially shorter than the overall width of the base strip. Where several liners are used side by side, this can be a disadvantage but it is overcome by the type of liner shown in FIGURES 5, 6 and 7. In this case, the working faces of the steel rods are co-extensive with the outer faces 11 of the channel sides and the rod ends are notched at 12 to accommodate the channel sides.

FIGURES 6 and 7 show the manner in which liners shown in cross-section in FIGURE 5 may be applied to a semicircular trough having end flanges 13. The trough is provided with longitudinal flanges 14 to which clamps 15 are bolted at intervals. As shown in FIGURE 7, steel rods 16 are interposed between the liners and the clamps.

Figure 9:
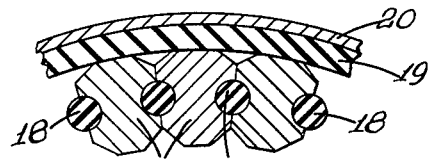
FIGURE 9 is a section on the line IX—IX of FIGURE 8.

As shown in FIGURES 8 and 9, the liner comprises essentially parallel steel rods 17 keyed together by rubber rods 18. A rubber backing strip 19 may, if desired, be interposed between the liner and the surface to be protected.

Figure 10:
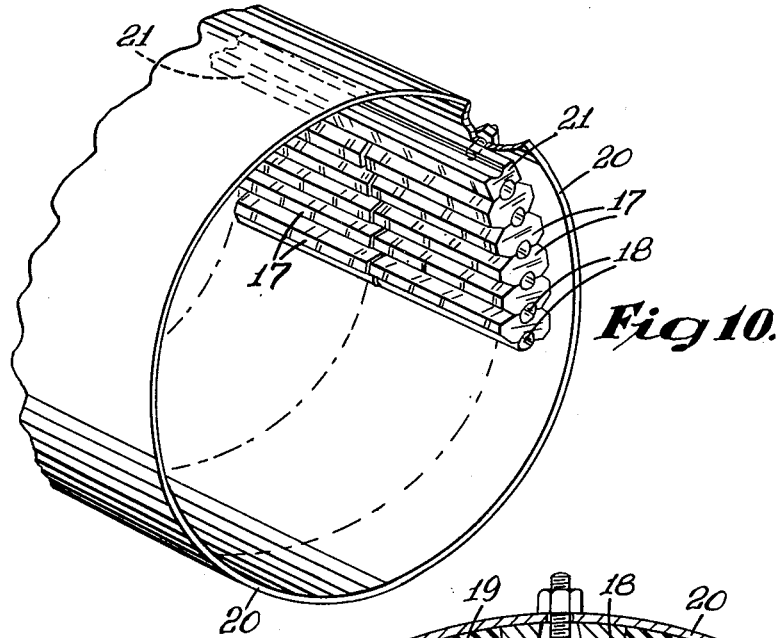
FIGURE 10 is an oblique view showing the manner in which the liner of FIGURES 8 and 9 may be applied to a circular casing.

The liner of FIGURES 8 and 9 may conveniently be used for protecting the inner peripheral walls of tube or other mills having a casing 20 of circular cross-section (FIGURE 10). Key plates 21 are bolted to the casing 20 between the ends of the liner to exert pressure in a circumferential direction and cause the liner to be self-supporting.

Figure 11:
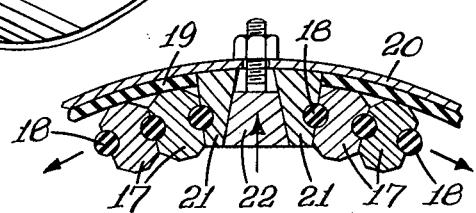
FIGURE 11 is a cross-sectional detail showing an alternative method of fixing the liner of FIGURES 8 and 9.

The key plates may alternatively comprise complementary wedge elements 21 and 22 as shown in FIGURE 11.

Among the advantages possessed by the liners of the invention are the following:

(a) The linear elements can easily be replaced in zones of localised wear.

(b) The linear members have an economic life since they are mass produced items. Furthermore, in cases where linear members of symmetrical cross-section can be used, the members are reversible.

(c) In the case of chutes, the linear members can be placed parallel to the direction of flow so as not to impede the flow of material.

(d) In the case of mats or tracks, the linear members can be placed at right angles to the direction of travel to provide a grip.

(e) Since the linear members can be fully supported by a channel section base strip, they can safely be made of hard, brittle material and even if a linear member breaks, the pieces will not fall out. This is of particular importance in providing liners for grinding mills.

(f) When lining the inside of curved surfaces, adjacent linear members held by a channel section base strip tend to press together and the base strip is stretched and tensioned. There is thus a tendency to keep the liner pressed against the curved surface and to this extent the liner is largely self-supporting. This again is important in providing liners for grinding mills.

We claim:

1. A liner comprising a plurality of rod-like members of rigid abrasion resisting material disposed in parallel relationship; key element interposed between adjacent members to lock them together; and a base strip of flexible material of substantially channel section, the rod-like members being located transversely to the base strip between the sides of the channel by which they are gripped.

2. A liner, according to claim 1, in which the inner faces of the channel sides are formed with ribs which are engageable with corresponding flutes in the end faces of the rod-like members.

3. A liner, according to claim 1, in which the sides of the channel include towards their outer ends, retaining formations extending inwards towards one another.

4. A liner, according to claim 1, in which the key elements and the base strip are bonded to one another.

5. A liner, according to claim 1, in which the rod-like members abut against the inner face of the bottom of the base strip.

6. A liner according to claim 1, in which the ends of the rod-like members are engageable with recesses in the inner faces of the sides of the channel section base strip and the working faces of the rod-like members are shorter than the overall length of such members to permit location of the working faces between the inner surfaces of the surrounds of the recesses.

7. A liner, according to claim 1, in which the working faces of the rod-like members are substantially equal in length to the overall width of the base strip, the ends of the rod-like members being notched to receive the surrounds of recesses in the sides of the base strip.

8. A liner, according to claim 1, in which the base strip is of composite construction, the base portion and the sides being separate.

9. A liner comprising a plurality of rods made of rigid abrasion resisting material disposed in parallel relationship; key elements interposed between adjacent members to lock them together; and at least one resilient side strip adapted to grip the said rods at one end thereof.

10. A liner, according to claim 9, including a second resilient side strip arranged to grip the said rods at the other end thereof.

11. A liner, according to claim 9, including a second resilient side strip arranged to grip the said rods at the other end thereof and a resilient central base element located between said side strips.

References Cited by the Examiner
UNITED STATES PATENTS

| | | | |
|---|---|---|---|
| 444,022 | 1/91 | Scott | 68—226 |
| 655,687 | 8/00 | Coffman | 68—226 |
| 679,804 | 8/01 | Vohs | 68—226 |
| 1,748,039 | 2/30 | Kennedy. | |
| 2,992,782 | 7/61 | Taubmann et al. | 241—182 |

J. SPENCER OVERHOLSER, *Primary Examiner.*

UNITED STATES PATENT OFFICE
CERTIFICATE OF CORRECTION

Patent No. 3,194,506        July 13, 1965

Ronald F. Bourne et al.

It is hereby certified that error appears in the above numbered patent requiring correction and that the said Letters Patent should read as corrected below.

Column 4, line 69, for "element" read -- elements --.

Signed and sealed this 15th day of February 1966.

(SEAL)
Attest:

ERNEST W. SWIDER
Attesting Officer

EDWARD J. BRENNER
Commissioner of Patents